United States Patent
Yamanishi et al.

(10) Patent No.: US 6,584,195 B1
(45) Date of Patent: Jun. 24, 2003

(54) TELEPHONE APPARATUS

(75) Inventors: Koji Yamanishi, Fukuoka (JP); Yoshiteru Ishii, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/247,853

(22) Filed: Feb. 11, 1999

(30) Foreign Application Priority Data

Feb. 13, 1998 (JP) .......................................... 10-030978

(51) Int. Cl.⁷ ................................................ H04M 1/00
(52) U.S. Cl. ........................................ 379/377; 379/351
(58) Field of Search ................................ 379/351, 377, 379/29.04, 215.01

(56) References Cited

U.S. PATENT DOCUMENTS

| | | | | |
|---|---|---|---|---|
| 5,394,465 A | * | 2/1995 | Jo ................................ | 379/377 |
| 5,680,447 A | * | 10/1997 | Diamond et al. ....... | 379/215.01 |
| 5,796,789 A | * | 8/1998 | Eftechiou ..................... | 379/35 |
| 6,122,353 A | * | 9/2000 | Brady et al. ................. | 379/351 |

FOREIGN PATENT DOCUMENTS

| | | |
|---|---|---|
| JP | 5-36956 | 5/1993 |
| JP | 10093667 | 4/1998 |

* cited by examiner

Primary Examiner—Forester W. Isen
Assistant Examiner—Jefferey Harold
(74) Attorney, Agent, or Firm—RatnerPrestia

(57) ABSTRACT

A telephone set, where the state of an own-telephone-set is on-hook, the off-hook state of a parallel-telephone-set is detected by comparing telephone-line voltage value with a first standard voltage value. In the state where the own-telephone-set is off-hook, the off-hook state of the parallel-telephone-set is detected by the following method, i.e., the telephone-line voltage value is measured in detail and a second standard voltage value for judging the off-hook state of the parallel-telephone-set is determined and the voltage value is stored in place of the first standard voltage value while the own-telephone-set is off-hooked, then if the line voltage value exceeds the second standard voltage value, the parallel-telephone-set is regarded as off-hook. The telephone set having the above circuit structure can control not to send an acknowledgment signal when an alert signal is input into the telephone line in the state where the parallel-telephone-set is detected to be off-hook accordingly, the data sounds of the acknowledgment signal and caller data are prevented from being noise heard through the parallel-telephone-set.

11 Claims, 6 Drawing Sheets

TELEPHONE APPARATUS

FIELD OF THE INVENTION

The present invention relates to a telephone set having a function of is playing caller data.

BACKGROUND OF THE INVENTION

In recent years, a visual call waiting service has become popular. The service is that second caller data can be displayed in the call waiting service of a telephone office, i.e. in the service when there is a call from a second caller during talk over the telephone, the line can be switched to the second caller.

FIG. 5 is a block diagram showing a structure of a conventional telephone set, and FIG. 6 is a flow chart for an explanation of the operation of the telephone set.

In FIG. 5, the telephone set comprises an alert-signal detector 2 for detecting an alert signal input through a telephone line 1, an acknowledgment-signal sender 3 for sending an acknowledgment signal when detecting the alert signal through the telephone line 1, a caller-data detector 4 for detecting caller data coming through the telephone line 1, a hook switch 5, storage 6 for storing the caller data obtained by the caller-data detector 4, a controller 7 comprising a microcomputer, and a duplex circuit 8 for sending and receiving the signals of talking and listening through the telephone line 1.

The operation of the telephone set having the above components is described hereinafter.

The telephone set, as shown in the flow chart of FIG. 6, always monitors the input of an alert signal (STEP 1) in its off-hook state and, when an alert signal is input, it sends an acknowledgment signal ACK (STEP 2), then receives caller data which comes after that, then displays and stores the data (STEP 3).

However, in the above structure of the conventional telephone set, there is a problem that the data sounds of the acknowledgment signal and the caller data are heard as noise through the parallel-telephone-set when it is in an off-hook state because the telephone set sends an acknowledgment signal upon receiving the alert signal regardless of the state of the parallel-telephone-set connected to the same telephone line. Also, when there is a public telephone network standard that an acknowledgment signal should not be sent in the state where the parallel-telephone-set connected to the same telephone line is off-hook, the off-hook state of the parallel-telephone-set has to be detected, otherwise the telephone set does not meet the standard.

SUMMARY OF THE INVENTION

The telephone set of the present invention comprises an own-telephone-set off-hook detector for detecting the off-hook state of the own-telephone-set, a parallel-telephone-set off-hook detector for detecting an off-hook state of the parallel-telephone-set connected to the same telephone line, a telephone-line-voltage detection circuit for detecting the voltage value of the telephone line, an alert-signal detector for detecting an alert signal input through the telephone line, an acknowledgment-signal sender for sending an acknowledgment signal when the alert-signal detector detects the alert signal, a caller-data detector for detecting a caller-data signals input through the telephone line after the acknowledgment-signal sender has sent the acknowledgment signal, and a controller for controlling the acknowledgment-signal sender not to send an acknowledgment signal when the alert signal is input in a state that the parallel-telephone-set off-hook detector detects the off-hook state of the parallel-telephone-set, and, the telephone set is so composed that the parallel-telephone-set off-hook detector judges the off-hook state of the parallel-telephone-set based on the data detected by the own-telephone-set off-hook detector and the telephone-line voltage value detected by the telephone-line-voltage detection circuit.

The above telephone set of the present invention realizes that the data sounds of an acknowledgment signal and caller data are prevented to be heard as noise through the parallel-telephone-set when it is in an off-hook state, by the method that the acknowledgment-signal sender does not send an acknowledgment signal when the alert signal is input in the state where the parallel-telephone-set off-hook detector detects that the parallel-telephone-set is off-hook.

DESCRIPTION OF THE PREFERRED EMBODIMENTS

Referring to the figures, the following is a description of the exemplary embodiments of the telephone sets of the present invention. In the figures, the same numerals are applied as in the conventional telephone set for the components having the same structure and the same operation.

Figure 1:
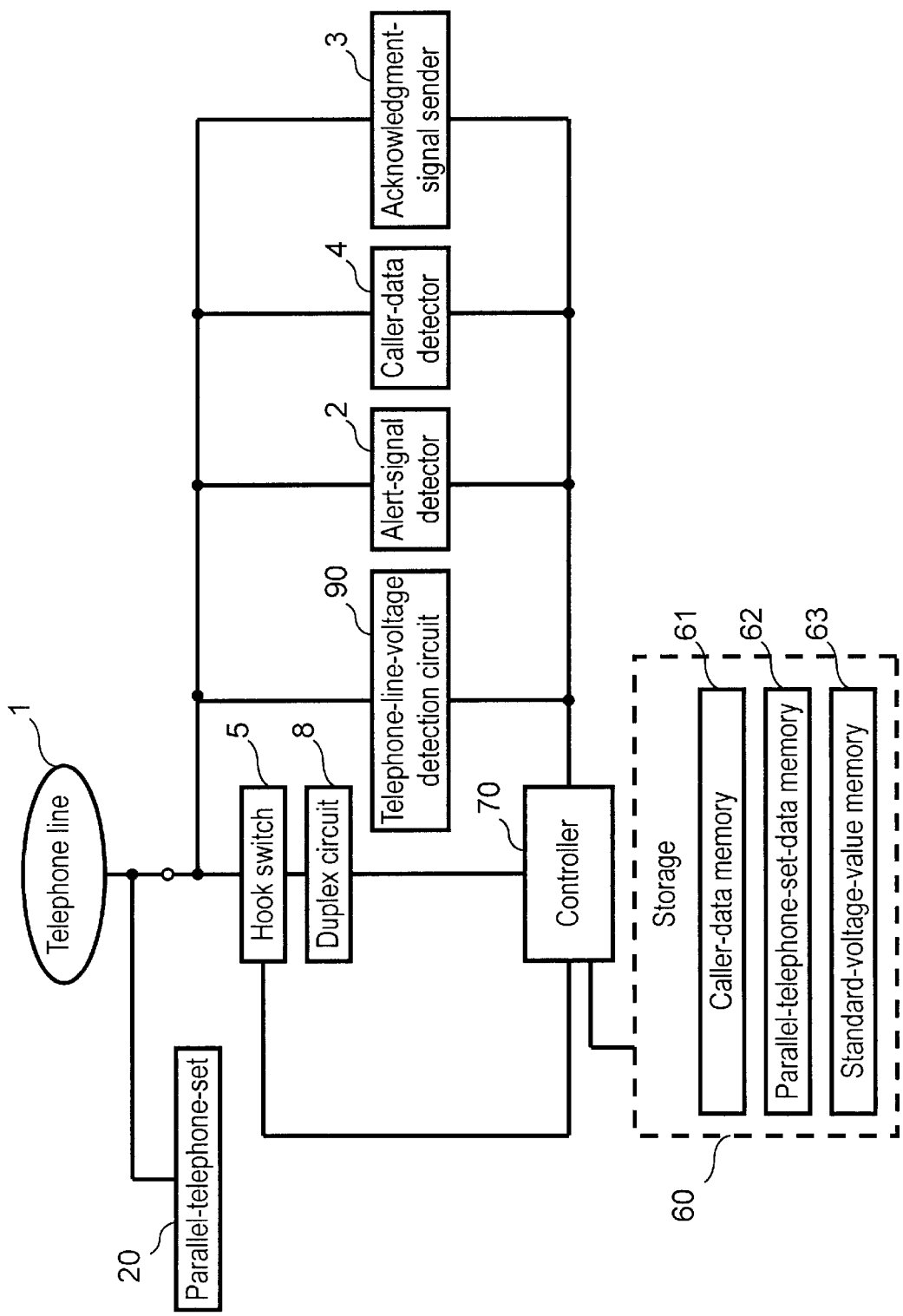
FIG. 1 is a block diagram showing main portions of a telephone set in an exemplary embodiment of the present invention.

As shown in FIG. 1, the telephone set of the present invention comprises an alert-signal detector 2 for detecting an alert signal input through a telephone line 1, an acknowledgment-signal sender 3 for sending an acknowledgment signal when detecting the alert signal through the telephone line 1, a caller-data detector 4 for detecting the caller data coming through the telephone line 1, a hook switch 5, storage 60, a controller 70 including a microcomputer, a duplex circuit 8 for sending and receiving the signals of talking and listening through the telephone line 1, a telephone-line-voltage detection circuit 90 for detecting the state of a parallel-telephone-set connected to the same telephone line, and a parallel-telephone-set 20 connected to the telephone line 1 to which an own-telephone-set is connected.

The storage 60 comprises three memories including a caller-data memory 61 for recording caller data obtained by the caller-data detector 4, a parallel-telephone-set-data memory 62 into which on- or off-hook data of the parallel-telephone-set connected to the same telephone line are written, and a standard-voltage-value memory 63 for storing a standard voltage value for detecting on- or off-hook states of the parallel-telephone-set.

Figure 2:
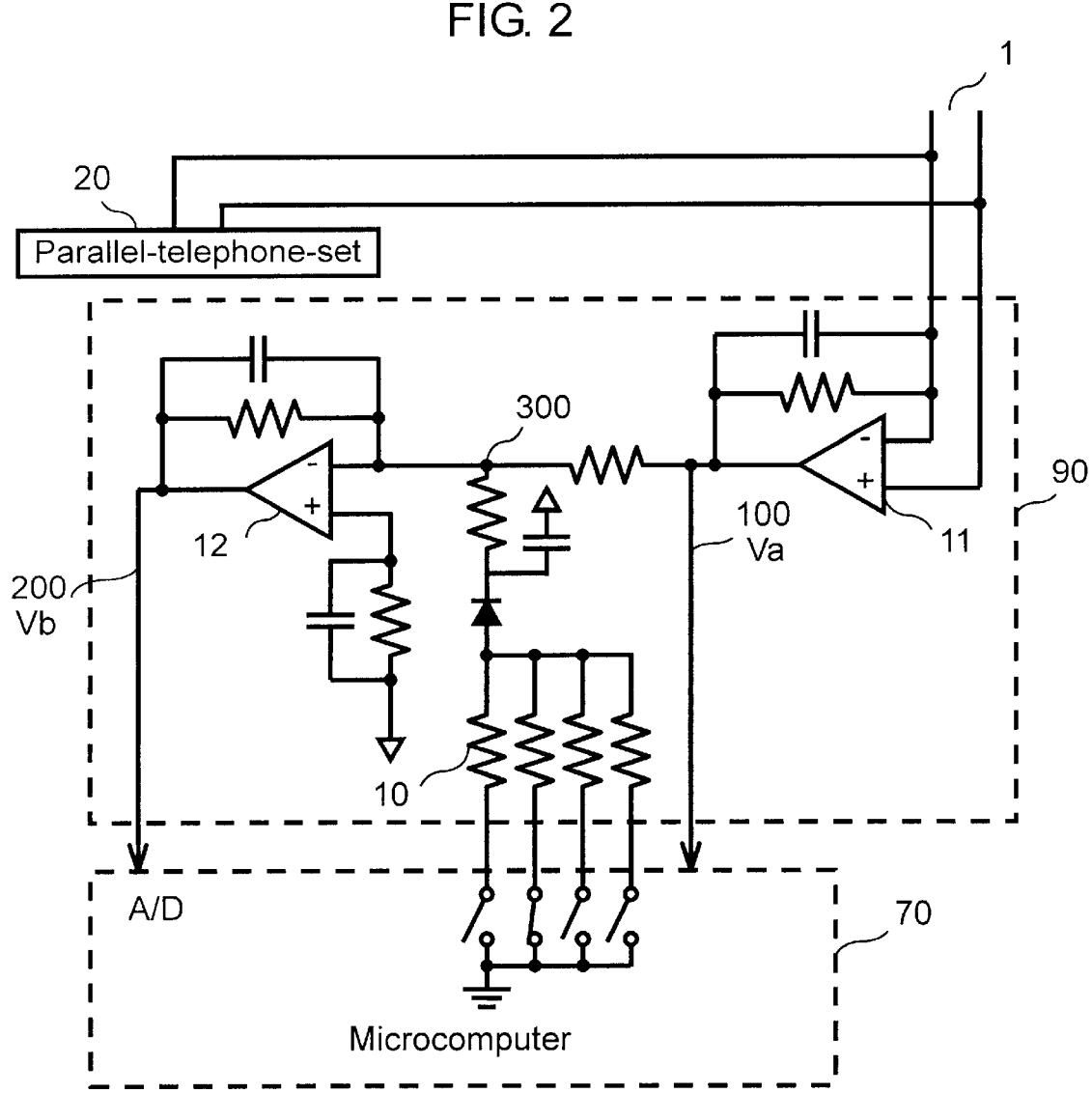
FIG. 2 shows a structure of a telephone-line-voltage detection circuit of the telephone set in the exemplary embodiment of the present invention.

Referring to FIG. 2, the structure and the operation of the telephone-line-voltage detection circuit 90 are described hereinafter. A voltage changer 10 comprises a plurality of resistors for changing the standard voltage value to a plurality of levels. In the controller 70, a plurality of switches are disposed for changing the levels of resistance value, and the switches are selectively opened or closed to ground by the operation of the microcomputer. In more detail, the levels of voltage value at a point 300 are changed by the method that one of the plurality of the resistors is selectively grounded by the switching control of the controller 70. The telephone-line-voltage detection circuit 90 has a first-step amplifier 11 and a second-step amplifier 12, and the output terminal of the first-step amplifier 11 is connected to the point 300 through a resistor. The point 300 is connected to an input terminal of the second-step amplifier 12. A point 100 is an output terminal of the first-step amplifier 11 having terminal voltage value Va, which is input to the controller 70. A point 200 is an output terminal of the second-step amplifier 12 having voltage value Vb, which is input to an analog-to-digital converter of the controller 70. The change of the voltage value Vb is always detected by the microcomputer through the analog-to-digital converter.

Telephone-line voltage value 48V is stepped down by the first-step amplifier 11 of the telephone-line-voltage detection circuit 90 to approximately 5V which can be measured by the microcomputer of the controller 70, to which the output voltage value Va of the first-step amplifier 11 is input. The method of detecting on- or off-hook state of the parallel-telephone-set 20 connected to the same telephone line is described hereinafter.

In the state where the own telephone set is on-hooked, the output voltage value Va is measured by the microcomputer of the controller 70, and if the voltage value is more than 3.4V, the parallel-telephone-set 20 is judged to be on-hook, on the other hand, if the voltage value is lower than that, the parallel-telephone-set is judged to be off-hook.

While, in the state where the own-telephone-set is off-hook, the resistance value between the point 300 and ground is changed by switching control of the microcomputer of the controller 70, i.e., each of the resistors of the voltage changer 10 is selectively grounded. The voltage value at the point 300 becomes a center voltage value of the second-step amplifier 12 as it is. The center voltage value of the second-step amplifier 12 changes. The divided voltage value of the output voltage value Va of the first-step amplifier 11 is amplified by the second-step amplifier 12.

In more detail, in the state where the own-telephone-set is off-hook, the voltage value at the point 300 is amplified by the second-step amplifier 12 so that the change of the output voltage value of the second-step amplifier 12 crosses the threshold voltage value for judging on- or off-hook state of the parallel-telephone-set. Then, the change of the output voltage value Vb of the second-step amplifier 12 is measured by the microcomputer of the controller 70. Accordingly the small change of the output voltage value Vb at the moment of off-hook of the parallel-telephone-set 20 can be detected by the microcomputer of the controller 70.

In this exemplary embodiment, in order to determine on- or off-hook of the parallel-telephone-set by the change of more than 0.5V of the telephone-line voltage, the microcomputer of the controller 70 is set to judge on- or off-state of the parallel-telephone-set by the change of more than 1V of the output voltage value Vb, which is the value amplified twice as much as the change of the telephone-line voltage value.

The operation of the telephone set configured as above is described hereinafter. As shown in a flow chart of FIG. 3, in the state that the own-telephone-set is off-hooked, i.e., in the state that the hook switch 5 of FIG. 1 is off-hooked, the hook state of the parallel-telephone-set connected to the same telephone line is always monitored (STEP 1). The details of detecting the hook state of the parallel-telephone-set are described later referring to FIG. 4.

Figure 3:
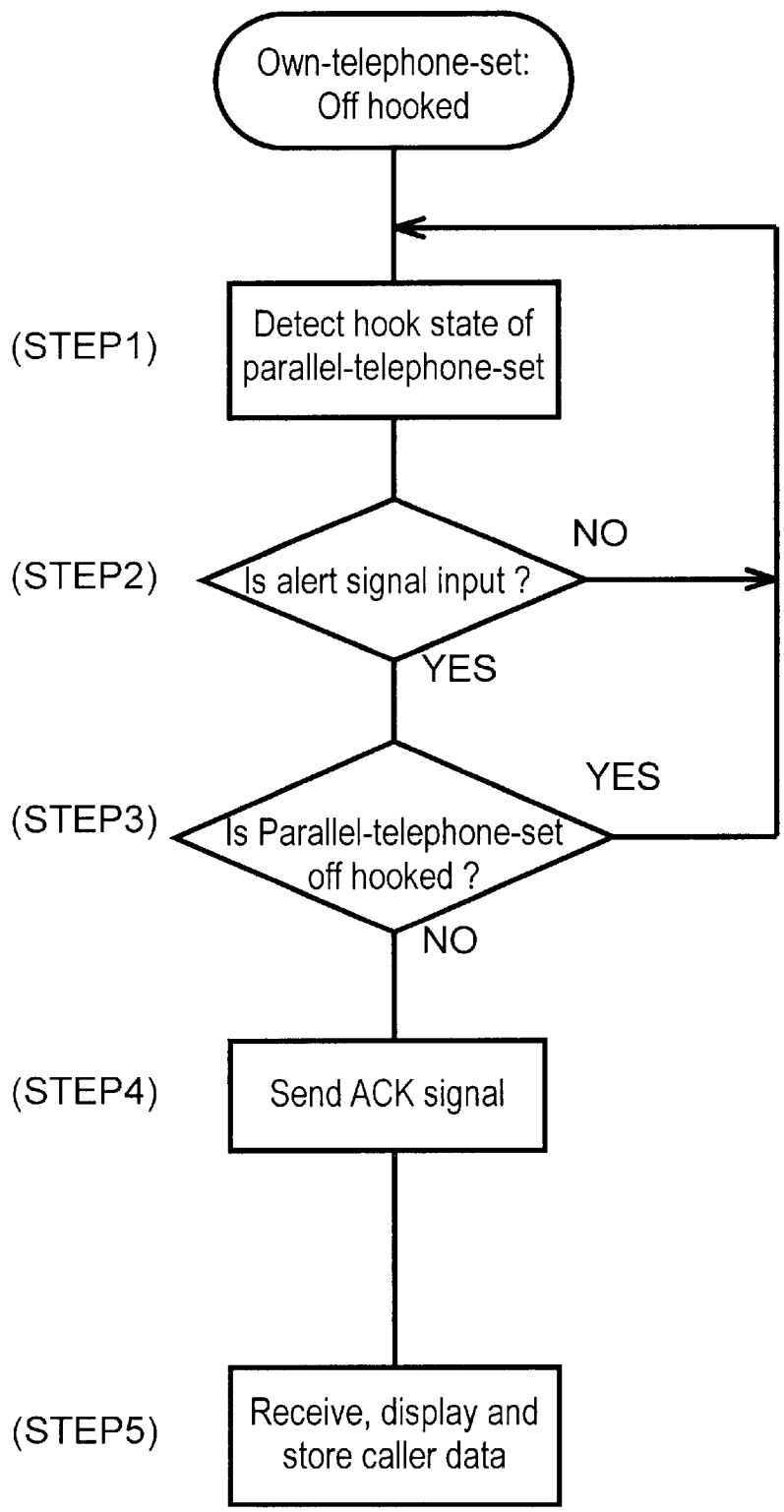
FIG. 3 is a flow chart for explanation of the operation of the telephone set in the exemplary embodiment of the present invention.

In FIG. 3, the input of the alert signal is also always monitored (STEP 2). Then, when the alert signal is input, the hook state of the parallel-telephone-set 20 is judged (STEP 3). Then, if it is in an off-hook sate, the alert signal is neglected, and, the hook state of parallel-telephone-set 20 and the input of the alert signal are monitored again. If it is in an on-hook state, acknowledgment signal ACK is sent (STEP 4), and the data sent after that are received and the data are displayed, at the same time the data are stored in the caller-data memory 61 (STEP 5).

Figure 4:
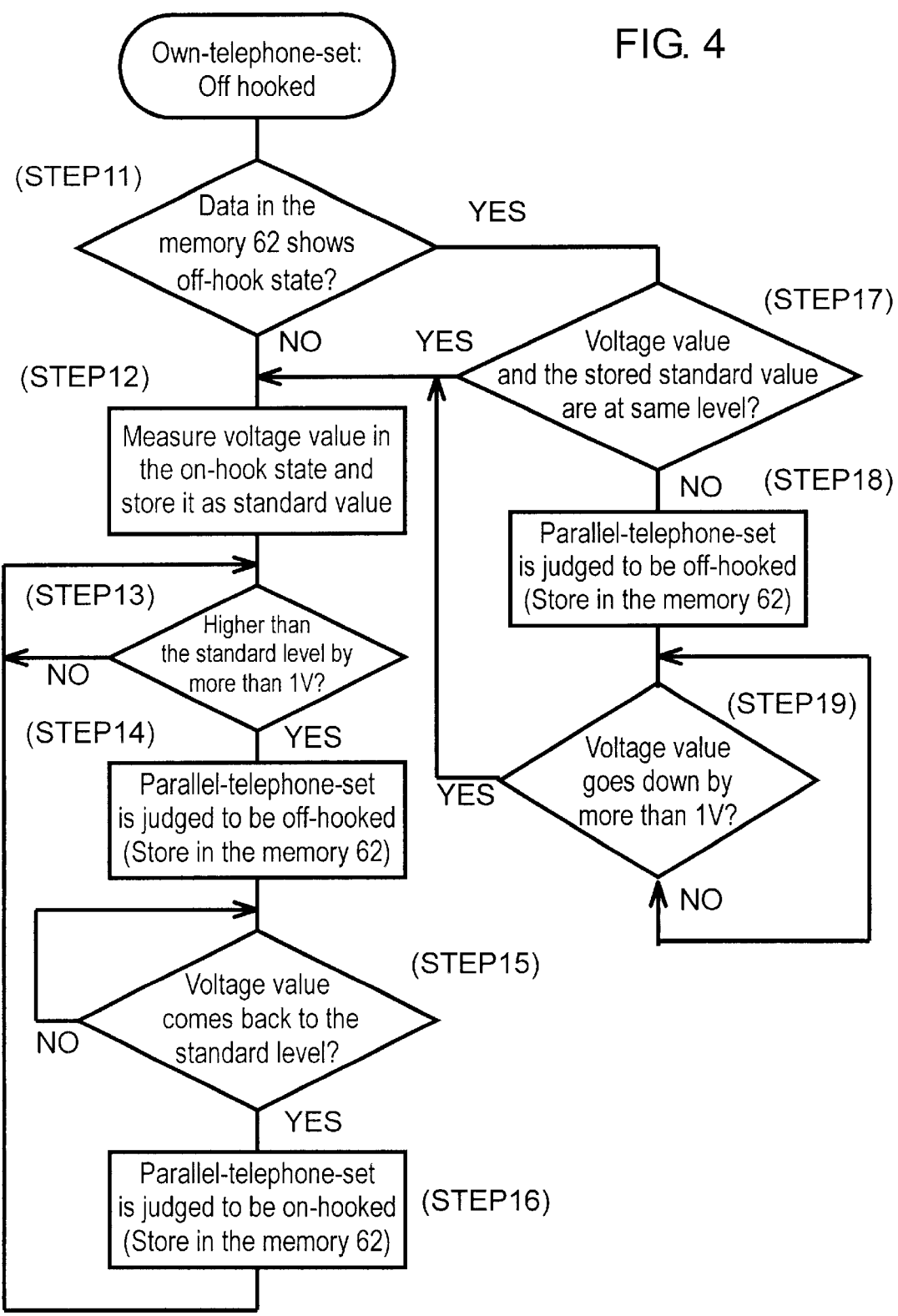
FIG. 4 is a flow chart for explanation of a telephone-line-voltage detection circuit of the telephone set in the exemplary embodiment of the present invention.
Figure 5:
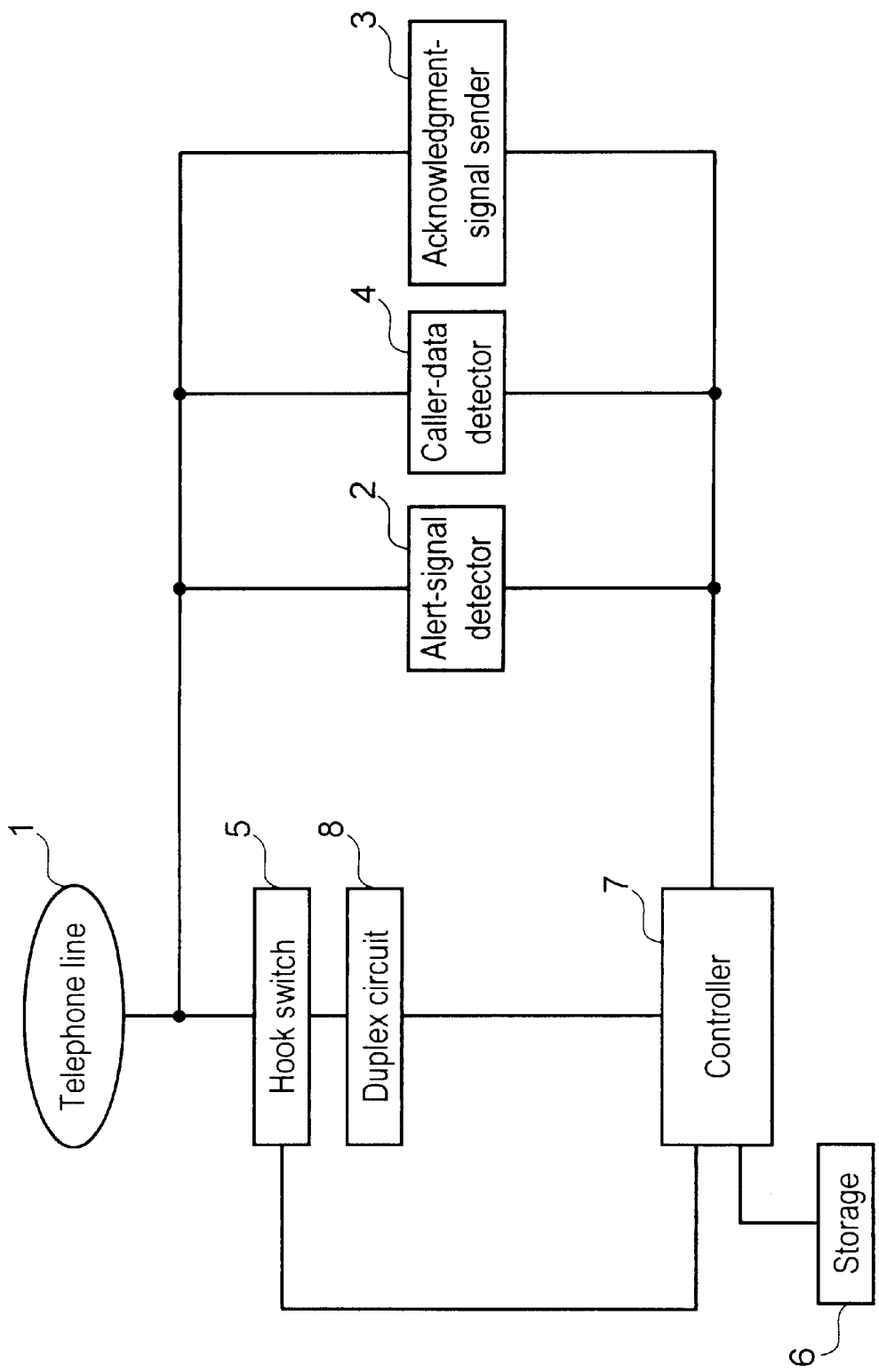
FIG. 5 is a block diagram showing main portions of a conventional telephone set.
Figure 6:
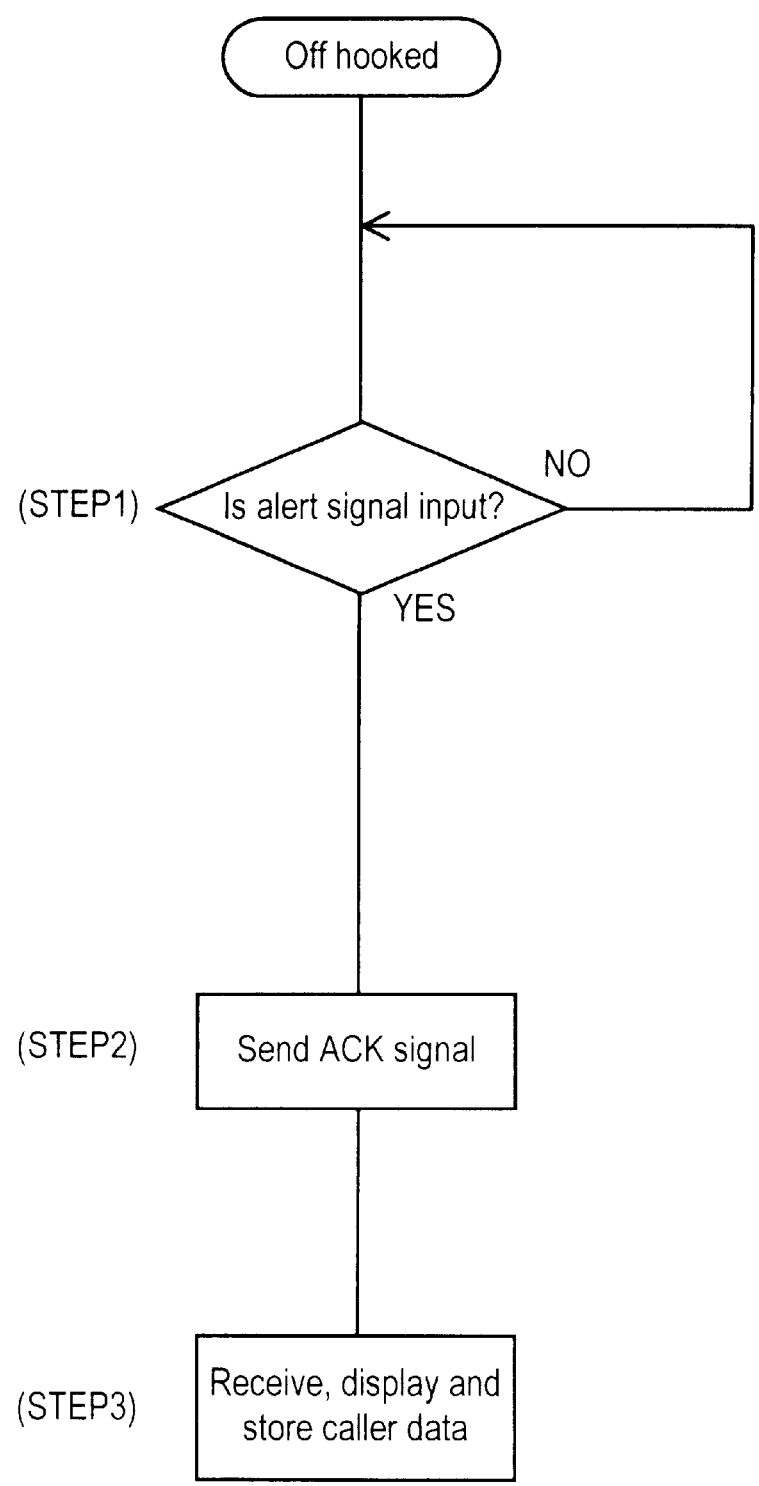
FIG. 6 is a flow chart for explanation of operation of the conventional telephone set.

FIG. 4 is a flow chart for explanation of the operation of the telephone-line-voltage detection circuit 90 in the state that the own-telephone-set is off-hook, in other words, it is a flow chart for explanation of operation for detecting the hook state of the parallel-telephone-set 20. In the state of waiting, i.e., in the state that the own-telephone-set is on-hook, if the output voltage value Va of the first-step amplifier of FIG. 2 for feeding to the microcomputer of the controller 70 is higher than the third standard voltage value 3.4V, the parallel-telephone-set connected to the same telephone line is judged to be on-hook, and the data of the on-hook state are written into the parallel-telephone-set-data memory 62. On the other hand, if the output voltage value Va of FIG. 2 for feeding to the microcomputer is lower than 3.4V, the parallel-telephone-set 20 connected to the same telephone line is judged to be in an off-hook state, and the data of the off-hook state is written into the parallel-telephone-set-data memory 62.

After that, in the state that the own-telephone-set is off-hook, the procedure of FIG. 4 is taken. The data of parallel-telephone-set-data memory 62 is referred to, and if the data shows an on-hook state (STEP 11: NO), it proceeds to STEP 12, then the output voltage value Vb of the second-step amplifier of FIG. 2 for feeding to the microcomputer of the controller 70 is measured by the microcomputer, and the voltage value is stored in the standard-voltage-value memory 63 as an standard voltage value (STEP 12).

After that, the output voltage value Vb of the second-step amplifier 12 for feeding to the microcomputer of the controller 70 is measured by the microcomputer (STEP 13), and, if the measured voltage value is higher than the standard voltage value in the memory 63 by more than 1V, the microcomputer judges that the parallel-telephone-set 20 connected to the same telephone line is off-hook (STEP 14). At the same time, the data of the off-hook state is written into the parallel-telephone-set-data memory 62.

In this case, the incident that the measured voltage value is higher than the standard voltage value in the memory 63 by more than 1V means that the telephone-line voltage value has gone down by more than 0.5V, because the polarity of the telephone line and that of output voltage value Vb of the second-step amplifier 12 are reversed and the change of the telephone-line voltage value is amplified by about twice as much in the circuit of FIG. 2. For instance, if the output voltage value Vb of the second-step amplifier 12 becomes higher than the standard voltage value by 1.2V, it means that the telephone-line voltage value has gone down by about 0.6V, by which the parallel-telephone-set 20 is judged to be off-hook.

After that, when the telephone-line voltage value comes back to the above standard voltage value (STEP 15: YES), the parallel-telephone-set is judged to be on-hook (STEP 16) again. At the same time, the data showing the on-hook state is written into the parallel-telephone-set-data memory 62.

On the other hand, in the state that the own-telephone-set is off-hook, if the data in the parallel-telephone-set-data memory 62 shows an off-hook state (STEP 11: YES), it proceeds to STEP 17. In STEP 17, the microcomputer of the controller 70 measures the input voltage value Vb, and compares it with a standard voltage value stored in advance at STEP 12.

As a result of the comparison, if the latest voltage value Vb and the standard voltage value stored in advance are at the same level (STEP 17), the parallel-telephone-set is judged to be on-hook again as well as the own-telephone set, then the voltage value is stored as a standard voltage value (STEP 12), and it proceeds to STEP 13 onwards as described above.

On the other hand, if the latest voltage value Vb is not at the same level (STEP 17: NO) with the standard voltage value stored in advance, the parallel-telephone-set 20 is determined to be still in an off-hook state. In this case, the data in the parallel-telephone-set-data memory 62 is kept in the state of off-hooked.

After that, if the input voltage value Vb goes down by more than 1V (STEP 19: YES), it means that the telephone-line voltage value has become higher by more than 0.5V, and the parallel-telephone-set 20 is determined to be on-hook and it proceeds to STEP 12 onwards.

As described above, the telephone set of the exemplary embodiment realizes that the data sounds of an acknowledgment signal and caller data are prevented from being heard as noise through the parallel-telephone-set 20 when it is off-hook, which meets the standard of public telephone networks.

Reference Numerals

1 Telephone line
2 Alert-signal detector
3 Acknowledgment-signal sender
4 Caller-data detector
5 Hook switch
8 Duplex circuit
10 Voltage changer
11 First-step amplifier
12 Second-step amplifier
20 Parallel-telephone-set
60 Storage
61 Caller-data memory
62 Parallel-telephone-set-data memory
63 Standard-voltage-value memory
70 Controller
90 Telephone-line-voltage detection circuit
100 Output terminal of first-step amplifier
200 Output terminal of second-step amplifier
300 Input terminal of second-step amplifier

What is claimed is:

1. A telephone apparatus for use with a telephone line to a parallel-telephone set, comprising:
    (a) own-telephone-set off-hook detection means for detecting the off-hook state of own-telephone-set;
    (b) parallel-telephone-set off-hook detection means for detecting the off-hook state of said parallel-telephone-set;
    (c) a telephone-line-voltage detection circuit for detecting voltage value of said telephone line;
    (d) alert-signal detection means for detecting an alert signal input through said telephone line;
    (e) acknowledgment-signal sending means for sending an acknowledgment signal when said alert-signal detection means detects an alert signal; and
    (f) control means for controlling said acknowledgment-signal sending means not to send an acknowledgment signal when said alert signal is input where said parallel-telephone-set off-hook detection means detects the off-hook state of said parallel-telephone-set;
    wherein, said parallel-telephone-set off-hook detection means determines that said parallel-telephone-set is off-hook based on data detected by said own-telephone-set off-hook detection means and telephone-line voltage value detected by said telephone-line-voltage detection circuit,
    in the state where the data detected by said own-telephone-set off-hook detection means shows that said own-telephone-set is on-hook, if said telephone-line voltage value is higher than a first standard voltage value, said parallel-telephone-set is determined to be on-hook, and, if said telephone-line voltage value is lower than said first standard voltage value, said parallel-telephone-set is determined to be off-hook, and
    in the state where the data detected by said own-telephone-set off-hook detection means shows that said own-telephone-set is off-hook, if said telephone-line voltage value is higher than a second standard voltage value, said parallel-telephone-set is determined to be on-hook, and, if said telephone-line voltage value is lower than said second standard voltage value, said parallel-telephone-set is determined to be off-hook.

2. The telephone apparatus according to claim 1, further comprising:
    caller-data detection means for detecting caller-data signals input through said telephone line after said acknowledgment-signal sending means has sent an acknowledgment signal.

3. A telephone apparatus according to claim 1, further comprising control means for determining to not send an acknowledgement signal in response to said alert signal when said parallel-telephone-set off-hook detection means detects the off-hook state of said parallel-telephone-set.

4. A telephone apparatus for use with a telephone line to a parallel-telephone set, comprising:
    (a) own-telephone-set off-hook detection means for detecting the off-hook state of own-telephone-set;
    (b) parallel-telephone-set off-hook detection means for detecting the off-hook state of said parallel-telephone-set;
    (c) a telephone-line-voltage detection circuit for detecting voltage value of said telephone line,
    said telephone-line-voltage detection circuit comprising a first-step amplifier for amplifying circuit voltage value of said telephone line, and a second-step amplifier for amplifying output voltage value of said first amplifier,
    (d) alert-signal detection means for detecting an alert signal input through said telephone line;
    (e) acknowledgment-signal sending means for sending an acknowledgment signal when said alert-signal detection means detects an alert signal; and
    (f) control means for controlling said acknowledgment-signal sending is means not to send an acknowledgment signal when said alert signal is input where said parallel-telephone-set off-hook detection means detects the off-hook state of said parallel-telephone-set;

wherein, said parallel-telephone-set off-hook detection means determines that said parallel-telephone-set is off-hook based on data detected by said own-telephone-set off-hook detection means and telephone-line voltage value detected by said telephone-line-voltage detection circuit, in the state where the data detected by said own-telephone-set off-hook detection means shows that said own-telephone-set is on-hooked, if the output voltage value of said first-step amplifier is higher than a third standard voltage value, said control means determines that said parallel-telephone-set is on-hook, and, if the output voltage value is lower than said third standard voltage value, said control means determines that said parallel-telephone-set is off-hook, and in the state where the data detected by said own-telephone-set off-hook detection means shows that said own-telephone-set is off-hook, said control means measures the output voltage value of said second-step amplifier, and determines a fourth standard voltage value based on the measured voltage value, and, if the output voltage value of said second-step amplifier becomes higher than said fourth standard voltage value, said control means determines that said parallel-telephone-set is off-hook.

5. The telephone apparatus according to claim 4, wherein, said telephone-line-voltage detection means further comprises a voltage-change means for changing the levels of voltage value input to said second-step amplifier, and in the state where the data detected by said own-telephone-set off-hook detection means shows that said own-telephone-set is on-hook, if the output voltage value of said first-step amplifier is higher than said third standard voltage value, said control means determines that said parallel-telephone-set is on-hook, and, if the output voltage value is lower than said third standard voltage value, said control means determines that said parallel-telephone-set is off-hook, and in the state where the data detected by said own-telephone-set off-hook detection means shows that said own-telephone-set is off-hook, said control means measures the output voltage value of said second-step amplifier and adjusts the level of voltage value input to said second-step amplifier by using said voltage-change means so that the changed value of the output voltage value of said second-step amplifier, when the parallel-telephone set is off-hook, crosses said fourth standard voltage value, and if the output voltage value of said second-step amplifier becomes higher than said fourth standard voltage value, said control means determines that said parallel-telephone-set is off-hook.

6. A telephone apparatus for use with a telephone line to a parallel-telephone-set, comprising:

(a) own-telephone-set off-hook detection means for detecting an off-hook state of own-telephone-set;

(b) a duplex circuit for sending and receiving the signals of talking and listening through said telephone line;

(c) a telephone-line-voltage detection circuit for detecting the state of said parallel-telephone-set;

(d) control means;

(e) alert-signal detection means for detecting an alert signal input through said telephone line; and (f) acknowledgment-signal sending means for sending an acknowledgment signal when said alert-signal detection means detects an alert signal;

wherein, said telephone-line-voltage detection circuit comprises a first-step amplifier for amplifying the telephone line voltage value of said telephone line, a second-step amplifier for amplifying the output voltage value of said first amplifier, and voltage-change means for changing the levels of voltage value input to said second step amplifier, and, said control means measures the output voltage value of said first-step amplifier and determines that said parallel-telephone-set is on-hook if the output voltage value is higher than a third standard voltage value, and determines that said parallel-telephone-set is off-hook if the output voltage value is lower than said third standard voltage value, in the state where the data detected by said own-telephone-set off-hook detection means shows that said own-telephone-set is on-hook, and in the state where the data detected by said own-telephone-set off-hook detection means shows that said own-telephone-set is off-hook, said control means measures the output voltage value of said second-step amplifier, and adjusts the level of voltage value input to said second-step amplifier by using said voltage-change means so that the changed value of the output voltage value of said second amplifier, when the parallel-telephone-set is off-hook, crosses a fourth standard voltage value, and then determines that said parallel-telephone-set is in a state of one of on- and off-hook based on said fourth standard voltage value.

7. The telephone apparatus according to claims 6, further comprising parallel-telephone-set-data memory into which one of on- and off-hook data of said parallel-telephone-set connected to the same telephone line are written, and, in the state where the data of said own-telephone-set off-hook detection means shows that said own-telephone-set is on-hook, one of on- and off-hook states of said parallel-telephone-set is determines based on said third standard voltage value, and the data showing the result is stored in said parallel-telephone-set-data memory, and, in the state where the data of said own-telephone-set off-hook detection means shows that said own-telephone-set is off-hook, one of on- and off-hook states of said parallel-telephone-set is determined based on said fourth standard voltage value, and the data showing the result is stored in said parallel-telephone-set-data memory.

8. The telephone apparatus according to claim 6, wherein said telephone-line-voltage detection circuit has a voltage-change means comprising a plurality of resistors for changing voltage value input to said second-step amplifier to a plurality of levels, and said control means measures the output voltage value of said second-step amplifier and adjusts the level of the input voltage value input to said second-step amplifier by selecting resistors of said voltage-change means so that the changed value of the output voltage value of said second amplifier, when said parallel-telephone-set is off-hook, crosses said fourth standard voltage value, in the state where said own-telephone-set off-hook detection means detects that said own-telephone-set is off-hooked.

9. The telephone apparatus according to claim 6, further comprising a parallel-telephone-set-data memory into which one of on- and off-hook data of said paralleltelephone-set connected to said same telephone line are written, and a standard-voltage-value memory for storing a latest standard voltage value, and, said control means determines that said parallel-telephone-set is in a state of one of on- and off-hooked based on said third standard voltage value, and stores the data showing the result in said parallel-telephone-set-data memory, in the state where the data detected by said own-telephone-set off-hook detection means shows that said own-telephone-set is on-hook, and in the state where said own-telephone-set off-hook detecting means detects that said own-telephone-set is off-hook, if the data in said parallel-telephone-set-data memory shows an on-hook state of said parallel-telephone-set, said control means measures the output voltage value of said second stage amplifier sent to said control means, and determines said fourth standard voltage value based on the measured voltage value, then the standard voltage value is stored in said standard-voltage-value memory, said control means continues measurement of the changed value of output voltage value of said second-step amplifier, and, if the output voltage value of said second amplifier exceeds said fourth standard voltage value, said control means determines that said parallel-telephone-set connected to said same telephone line is off-hooked, and writes the data showing the off-hook state of said parallel-telephone-set into said parallel-telephone-set-data memory, if the output voltage value of said second amplifier comes back to the level within said fourth standard voltage value, said control means determines that said parallel-telephone-set is on-hook, and writes the data showing the on-hook state of said parallel-telephone-set into said parallel-telephone-set-data memory.

10. The telephone apparatus according to claim 6, further comprising:

caller-data detection means for
detecting caller-data signals input through said telephone line after said acknowledgement-signal sending means has sent an acknowledgment signal.

11. A telephone apparatus according to claim 6, wherein it is determined to not send an acknowledgement signal in response to said alert signal when said parallel-telephone-set is detected to be off-hook.

* * * * *